No. 778,142. PATENTED DEC. 20, 1904.
C. PARKER.
DEVICE FOR AUTOMATICALLY APPLYING AIR BRAKES
IN CASE OF EMERGENCY.
APPLICATION FILED OCT. 17, 1904.
NO MODEL.
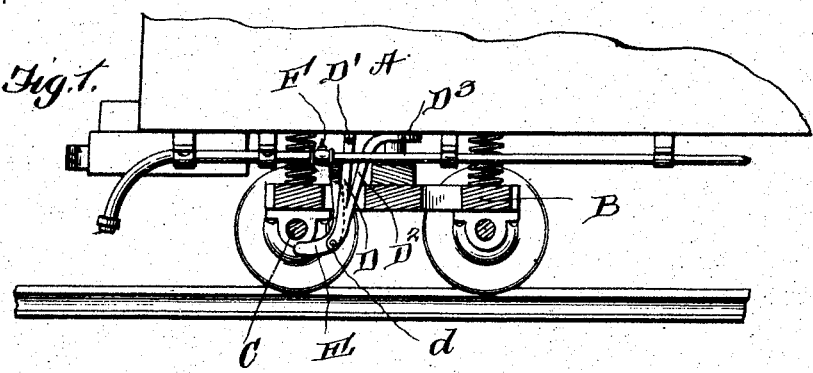
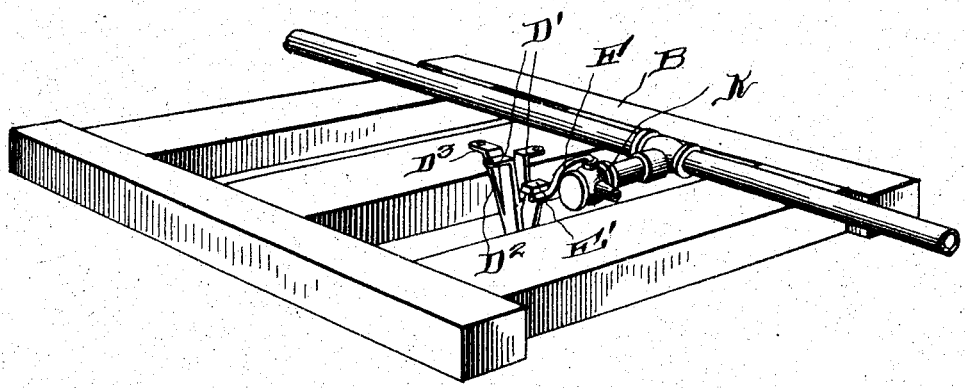
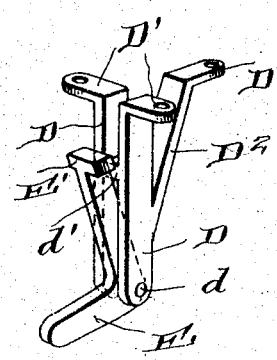
Witnesses
R. A. Boswell
Nellie A. Mayhew
Inventor
Charles Parker
By Franklin H. Hough
Attorney No. 778,142. Patented December 20, 1904.

UNITED STATES PATENT OFFICE.

CHARLES PARKER, OF MONROEVILLE, OHIO.

DEVICE FOR AUTOMATICALLY APPLYING AIR-BRAKES IN CASE OF EMERGENCY.

SPECIFICATION forming part of Letters Patent No. 778,142, dated December 20, 1904.

Application filed October 17, 1904. Serial No. 228,829.

*To all whom it may concern:*

Be it known that I, CHARLES PARKER, a citizen of the United States, residing at Monroeville, in the county of Huron and State of Ohio, have invented certain new and useful Improvements in Devices for Automatically Applying Air-Brakes in Case of Emergency; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in emergency-brake-applying apparatus for use in connection with a pneumatic system of air-brakes, and comprises an angle-lever pivotally mounted underneath the truck of a car and so arranged that as the truck leaves the track the lever will be tilted and the valve of the train-pipe will be actuated, allowing the brakes to set.

The invention consists, further, in various details of construction and combinations and arrangements of parts, as will be hereinafter fully described and then specifically defined in the appended claims.

My invention is illustrated in the accompanying drawings, which, with the letters of reference marked thereon, form a part of this application, and in which—

Figure 1 is a side elevation of a portion of a car, showing a sectional view through the truck with my brake-applying apparatus illustrated in elevation. Fig. 2 is a detail perspective view of a portion of the train-pipe and the brake-applying mechanism, and Fig. 3 is a detail perspective view of the angled lever and support therefor.

Reference now being had to the details of the drawings by letter, A designates a car, and B a truck of the usual construction, the latter being held to the frame of the car by means of a pivotal pin and so arranged that in case the truck should leave the track said truck, which will be detached from the car, will actuate the mechanism for applying the brake.

C designates one of the axles of the truck, and D D designate two bracket-arms, which are connected by means of a pin $d$ at their lower ends, and their upper ends D' are angled and are adapted to be fastened to the bottom of the car, as shown in Fig. 1 of the drawings. A branching arm $D^2$ projects from the arms D and has its angled end $D^3$ fastened to the bottom of the car, whereby the brackets may be securely braced and held rigidly to the bottom of the car. A cross-piece $d'$ connects the arms D and serves as a stop to limit the throw of the angle-lever E in one direction. Said angle-lever E is pivotally mounted upon the pin $d$ and has a cross-piece E' at the upper end thereof for the purpose of affording a considerable surface for contact with the handle F of the valve within the valve-chamber K for regulating the supply of air for applying the air-brakes of the train.

It will be observed upon reference to Fig. 1 of the drawings that the lower free end of the angle-lever is positioned underneath the axle C and its upper end positioned adjacent to said handle F and in the event of the truck leaving the track and becoming detached from the car said axle bearing down upon the lower angled end of the lever will cause the same to tilt upon its pivotal pin and the cross-piece at the top of the lever will turn the handle F and allow the brakes to be instantly set, thereby affording a simple and efficient means for applying the brakes for emergency purposes.

While I have shown a particular detailed construction of apparatus illustrating my brake-applying device, it will be understood that I may vary the details of the same, if desired, without departing from the spirit of the invention.

Having thus fully described my invention, what I claim as new, and desire to be secure by Letters Patent, is—

1. An emergency-brake-applying apparatus for air-brake systems comprising, in combination with a car, a train-pipe supported thereby, a truck, axles mounted thereon, a bracket member having arms at angled ends secured to the bottom of the car, an angle-lever pivotally mounted between said arms and having one end thereof extending underneath one of the axles of said truck, its upper end adapted to actuate a valve in the train-pipe as the lever is tilted in one direction, as set forth.

2. An emergency-brake-applying apparatus for trains having air-brake systems, a train-pipe, a valve with handle projecting from the stem thereof, a truck underneath the car, axles journaled in suitable bearings in said truck, a brace member having arms with angled ends secured to the bottom of the car and extending through said truck, an angle-lever pivotally mounted at the lower end of said brace member and having a cross-piece at the upper end thereof, a stop intermediate two of said arms to limit the throw of said angle-lever in one direction, the lower end of said lever adapted to be positioned underneath one of the axles of said truck and to be actuated by said axle underneath which it is positioned in the event of the truck leaving the track, whereby said lever may be tilted and the cross-piece at the end thereof actuate the valve of the train-pipe, as set forth.

In testimony whereof I hereunto affix my signature in presence of two witnesses.

CHARLES PARKER.

Witnesses:
A. L. HOUGH,
FRANKLIN H. HOUGH.